United States Patent Office 3,110,522
Patented Nov. 12, 1963

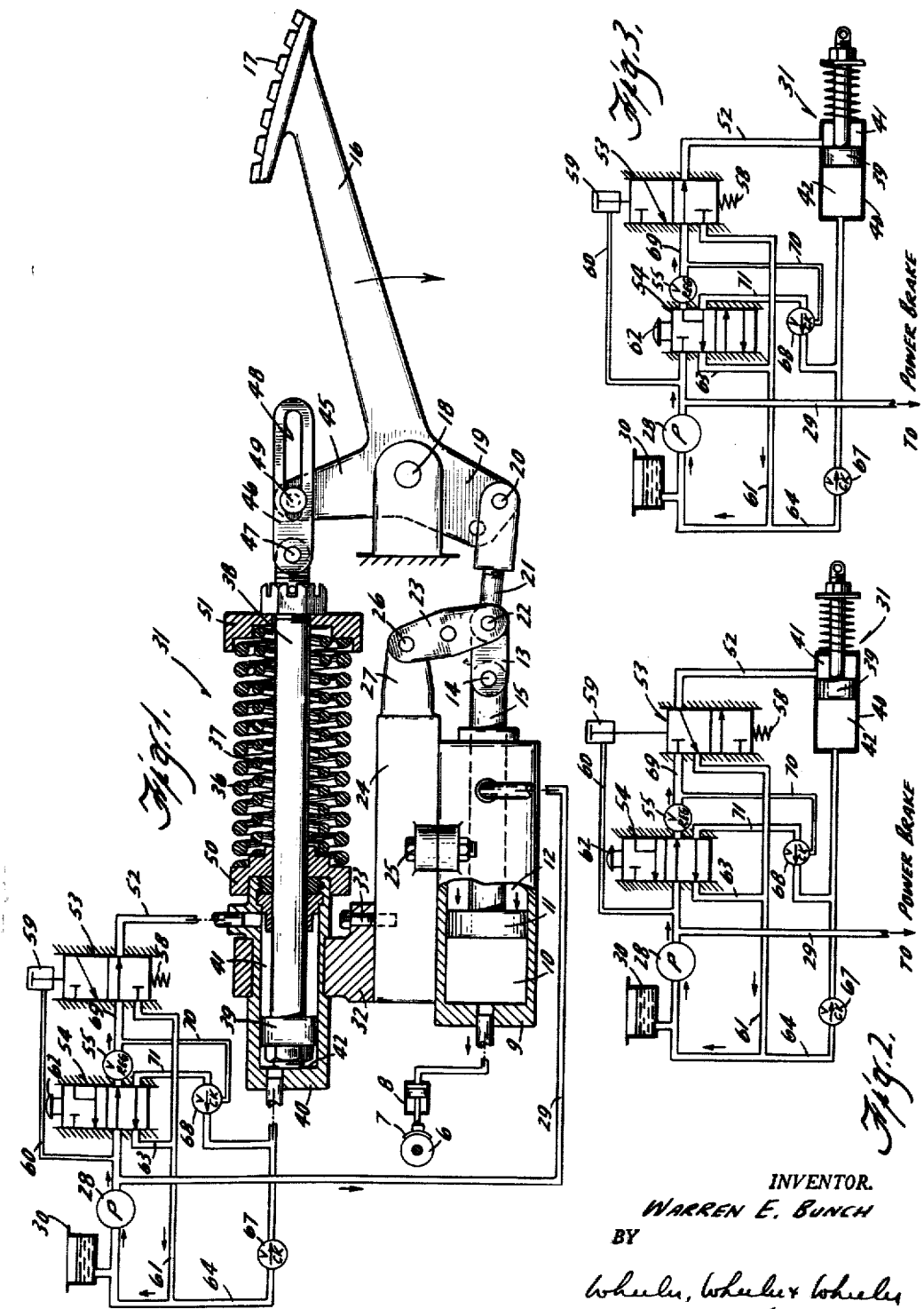

3,110,522
FLUID POWER ASSIST DEVICE FOR
BRAKE APPARATUS
Warren E. Bunch, Wauwatosa, Wis., assignor to Harnischfeger Corporation, Milwaukee, Wis., a corporation of Wisconsin
Filed June 16, 1961, Ser. No. 117,621
12 Claims. (Cl. 303—9)

This invention relates to a fluid power assist device for brake apparatus and particularly to an auxiliary source of emergency pressure to maintain power assist braking pressure in the event of pump or line failure or the like.

While not limited thereto, the invention will be described as it is embodied in an installation in a power excavator.

Power excavators typically have a hoist drum over which a hoist cable is wound to raise and lower the shovel on its boom or dipper stick. The hoist drum has a source of power and also has a brake by which the cable may be locked with the bucket elevated. This is necessary, for example, when the bucket contains a load and it is desired to swing the boom around in an elevated position to dump bucket contents into a trunk or when the bucket simply is to remain elevated while waiting for a truck to position itself therebeneath.

It is not uncommon to power the hoist drum brake hydraulically or by other fluid pressure operators. According to the present invention, a power assist device is provided for the power braking of the brake mechanism. Even more importantly, the present invention contemplates auxiliary apparatus to insure against the consequences of a hydraulic pump failure or other accident which would result in loss of fluid pressure in the power assist device.

But for such auxiliary apparatus, the operator could not effectively brake the hoist drum and if a heavy load were elevated in a bucket, considerable damage to property and possible injury to life might occur if the bucket is simply permitted to fall free or without the application of effective braking force thereto.

According to the present invention, there is provided an emergency source of fluid pressure to substitute for the pressure previously supplied by the pump in the event of pump or line failure.

Moreover, according to the present invention, the power assist device and the auxiliary source of pressure which substitutes therefor, are desirably used only in conjunction with a manually applied brake pedal or the like subject to the direct control of the operator. Ideally, the power assist device will supply about 70 percent of the power, the operator supplying the remaining 30 percent through a manually-actuated foot pedal. This division of effort is particularly desirable in the environment of a power shovel where sudden braking of the drum might tip the shovel over or break the boom. If the operator retains a substantial amount of personal control, this danger is largely overcome, because the brake can be applied more smoothly.

Apparatus embodying the present invention has an additional advantage in that the auxiliary source of fluid pressure is also available for use in a manner to supplement the power assist, even where there has been no emergency. This enables the operator to remove his foot from the manually-operated brake lever, the brake drum being locked by the auxiliary device in any desired position.

Other objects, features and advantages of the invention will appear from the following disclosure in which:

FIG. 1 is a partial elevation and partial cross section of apparatus embodying the invention, certain parts being shown only schematically.

FIG. 2 is a fragmentary schematic diagram of the apparatus shown in FIG. 1 with the valves shown in a different position.

FIG. 3 is a fragmentary schematic diagram of the apparatus shown in FIG. 1 with the valves shown in a still different position.

The drawing and this description will be limited to the braking apparatus, the general construction of power excavators and the like being well known and for which no illustration here is necessary. The excavator or like apparatus has a brake drum 6 against which the brake shoe 7 may be pressed by a fluid motor 8 which may be either air operated or hydraulically operated.

Assuming for purposes of exemplification, a hydraulic system, the hydraulic motor 8 is supplied with pressurized hydraulic fluid by the cylinder 9 which has a chamber 10 at one side of a piston 11 and a chamber 12 at its other side.

The piston 11 has a rod 15 which is subject to direct manual actuation by the operator through manipulation of lever 16 on foot pedal 17. Lever 16 is fulcrumed on the pintle 18 and has a short arm 19 pivotally connected on the pin 20 to the link 21, which is in turn pivotally connected to piston rod 15 through link 13 and pins 14, 22. The rod is guided by a swing link 23 which is pivotally connected on pin 26 to the stationary lug 27 on bracket 24 which is in turn fastened to the cylinder 9 by bolts 25.

To relieve the operator of the major part of the work involved in manually pressurizing the hydraulic fluid in the chamber 10, cylinder 9 functions as part of a hydraulic power assist device, its chamber 12 being pressurized by pump 28 through the pressure line 29. Pump 28 draws hydraulic fluid from the reservoir 30 and is set to deliver hydraulic fluid at such a pressure that about 70 percent of the braking pressure applied to the brake shoe 7 is derived from the pressure of the fluid in chamber 12, the remaining 30 percent being exerted by the operator manually on the foot pedal 17. Accordingly, the operator retains a large measure of control over the braking effort for smooth and skilled operation of the hoist.

It is an important feature of the present invention that means are provided to substitute for the pressure of the fluid in chamber 12 in the event of failure of the pump 28 and/or line 29, etc. For this purpose, there is provided an emergency or auxiliary power assist device indicated generally by reference character 31 and which desirably has a mounting bracket 32 fastened to the bracket 24 by bolts 33.

The auxiliary power assist device may consist of multiple coil springs 36, 37, which are helically wound about guide rod 38. One end of the rod 38 is provided with a piston 39 within a double-acting cylinder 40 normally subject to hydraulic fluid pressure in its chamber 41 and selectively subject to hydraulic fluid pressure in its chamber 42.

The other end of the rod 38 has a lost motion connection to another short arm 45 on the foot pedal lever 16. This lost motion connection consists of a rod extension 46 which is pivotally connected to rod 38 on pin 47 and which has an elongated slot 48 which confines pin 49 mounted on the foot pedal arm 45. Lever 16 is accordingly free to swing within the range of movement of pin 49 in seat 48 when the springs 36, 37 are fully retracted as shown in FIG. 1.

Corresponding ends of springs 36, 37 seat on a stepped collar 50 which is fastened to the cylinder 40. The opposite ends of the springs seat on a stepped collar 51 fastened to the otherwise free end of the rod 38. The bias of springs 36, 37 urges collar 51 and rod 38 toward the right, as shown in FIGURE 1, but when subjected to pump 28, the pressure of fluid in the chamber 41 holds the rod retracted against the bias of its springs 36, 37 and in its position also shown in FIG. 1.

Chamber 41 is pressurized through the hydraulic fluid line 52 which normally communicates through appropriate ports in valves 53 and 54 and intervening fluid line 69 directly with the pump 28. A pressure regulator valve 55 may be provided in lines 69 for control of the pressure in chamber 41.

In the event of failure of the pump 28, the pressure in the chamber 12 of cylinder 9 of the power assist device will drop. But for the auxiliary pressure source 31, the operator will be the sole source of braking pressure through the foot pedal 17. However, any loss of pressure in the power assist chamber 12 will be accompanied by a corresponding drop of pressure in the chamber 41 of the cylinder 40. Springs 36, 37 will then assert their bias unrestrained by the piston 39 to force the rod 38 to the right in FIG. 1. Pressure will thus be exerted on the pin 49 and through the crank arm linkages 45, 19 to exert a mechanical force on the piston rod 15, which will ordinarily be predetermined to substantially make up for the loss of fluid pressure on the piston which had previously existed in the chamber 12.

Accordingly, approximately 70 percent of the power to operate the fluid motor 8 will come from the mechanical power assist apparatus 31 and the operator can continue to control the hoist without need for any more manual pressure on the foot pedal 17 than was required prior to the emergency.

When there is a loss of pump pressure as aforesaid, the fluid trapped within the chamber 41 of cylinder 40 must be vented to permit the springs 36, 37 to function as aforestated. This is accomplished in the hydraulic circuit shown in the drawings, particular reference being made to the valve 53. Valve 53 is biased towards its position shown in FIG. 2 by a tension spring 58. So long as the pump is supplying pressure, valve 53 will be held in its FIG. 1 position against the bias of spring 58 by a hydraulic motor 59 powered from the pump through the hydraulic line 60. On loss of pressure, however, the spring 58 overcomes the motor 59 to move valve 53 to its FIG. 2 position, whereupon hydraulic fluid previously trapped in chamber 41 of the cylinder 40 will return through appropriate ports in the valve 53 to the reservoir 30 through the fluid line 61. Moreover, when piston 39 moves to the right as shown in FIG. 2, chamber 42 will fill with hydraulic fluid drawn from reservoir 30.

When pump pressure is restored, hydraulic motor 59 will return valve 53 to its FIG. 1 position and will repressurize chamber 41 to retract springs 36, 37 against their bias and relieve the piston 15 of the pressure of the springs. Pilot-operated valve 68 will be opened by the pressure of hydraulic fluid in bypass line 70 to permit the fluid in chamber 42 to return to sump 30 through lines 71, 63, 61.

During the time period that the auxiliary device 31 is functioning as a substitute power assist for the foot pedal 17, the operator may continue to operate the hoist brake substantially as he did prior to the power failure, as though the pump had not failed.

The apparatus herein disclosed is also adapted to "lock" the hoist drum in any position to permit the operator to remove his foot from the pedal 17. This function of the device is not dependent on any emergency and is initiated at the option of the operator. Under these circumstances, the pressure of the auxiliary source 31 is additive to the fluid pressure in the chamber 12 of the power assist cylinder 9, which remains effective. This is illustrated in FIG. 3, where the pump 28 continues to operate at full pressure, but valve 54 is moved pursuant to actuation of its manual control handle 62 to its position shown in FIG. 3. Valve 54 thus blocks flow of fluid to the chamber 41 of the cylinder 40 and permits return of fluid within the chamber 41 through the lines 52, 69, 63, 61 to the reservoir 30. This will affect the emergency or auxiliary power device 31 in the same manner as would a pump failure.

The release of pressure in the chamber 41 of cylinder 40 permits the springs 36, 37 to expand to their position shown in FIG. 3. Fluid will concurrently be drawn into the chamber 42 behind the piston 39 from the reservoir 30 through the line 64 and through the check valve 67. Reservoir 30 will conventionally be placed above the level of cylinder 40 to permit gravity flow of fluid into chamber 42.

Because of check valves 67 and 68, fluid in the chamber 42 cannot get out of the chamber 42 under FIG. 3 conditions (pilot line 70 being unpressurized). Accordingly, the auxiliary power apparatus 31 will be locked in its pressure asserting position and the operator can remove his foot from the pedal 17 without releasing the brake.

To restore the apparatus to normal operation, valve 54 is manually returned to its FIG. 1 position. This will pressurize the line 69 and also pressurize the pilot operator line 70 for check valve 68 at a pressure somewhat higher than that existing in chamber 42, thus to open valve 68 and permit fluid in chamber 42 to return through the lines 71, 63, 61 to the reservoir 30. This permits the pressure in chamber 41 of cylinder 9 to compress the springs 36, 37 against their bias and restore the apparatus to its FIG. 1 position.

It is clear from the foregoing that an important feature of the invention resides in the joint action of the manually depressed pedal lever 16 and the pressure existing in the chamber 12 of the power assist cylinder 9. In this manner, the operator retains control, even when the brake is operated primarily by the power assist device. This characteristic feature of the apparatus is not altered under emergency conditions when the springs 36, 37 substitute for the pressure in chamber 12, because these springs act on the same piston that the fluid pressure in the chamber 12 otherwise acts upon. In essence, the springs 36, 37 function to maintain pressure on the fluid in the chamber 10 and ultimate control is still exercised by the operator by manipulation of the foot pedal 17. This feature also facilitates use of the auxiliary pressure device 31 to lock the brake as aforestated, the auxiliary device under such conditions substituting for the pressure of the manual foot pedal operated lever 16.

I claim:

1. The combination with a manual brake operator having a fluid pressurized brake assist and linkage means interconnecting the same for joint action, of means to substitute for said brake assist on loss of fluid pressure therein and comprising normally restrained auxiliary pressure applying means, means interconnecting the said auxiliary means to said linkage means and means responsive to said loss of fluid pressure to release said auxiliary pressure applying means and pursuant to which it will substitute for the depressurized brake assist.

2. The combination of claim 1 in which the brake assist comprises means having sufficient capacity to normally furnish the major part of braking effort requirements, said auxiliary pressure applying means having substantially comparable capacity, the remaining minor part of braking effort requirement being furnished manually.

3. The combination of claim 1 in which the manual brake operator includes a lever, said fluid pressurized brake assist comprising a piston, a cylinder containing pressurized fluid behind the piston, a piston rod to which said lever is interconnected by said linkage means and a cylinder of fluid ahead of said piston and subject to be pressurized by said piston pursuant to the total force exerted on said piston both by the fluid behind it and through said piston rod.

4. The combination of claim 3 in which said auxiliary pressure means comprises a spring, the means interconnecting it to the linkage means comprising a lost motion coupling.

5. The combination with a brake, a fluid motor for the brake and a fluid power operator for the motor and comprising a cylinder, a first fluid chamber in said cylinder communicating with said fluid motor, a piston in said cylinder for pressurizing the fluid in the first fluid chamber and means for actuating the piston comprising a second fluid chamber in said cylinder at the side of the piston oposite said first chamber and a source of pressurized fluid for said second chamber, of a normally restrained auxiliary piston actuator and motion transmitting connections therefrom to said piston and means responsive to loss of fluid pressure in the second fluid chamber to release said auxiliary piston actuator for actuation of the piston through said connections.

6. The combination with a brake, a fluid motor for the brake and a fluid power operator for the motor and comprising a cylinder for fluid, a piston for pressurizing the fluid in the cylinder and means for actuating the piston comprising a pressurized fluid cylinder behind the piston and a source of fluid therefor, of a normally restrained auxiliary piston actuator and motion transmitting connections therefrom to said piston and means responsive to loss of fluid pressure in the fluid cylinder behind the piston to release said auxiliary piston actuator for actuation of the piston through said connections, said motion transmitting connections including a rod for the piston, in further combination with a manually operated lever and linkage means connecting the lever to the piston rod.

7. The combination of claim 5 in which the auxiliary piston actuator comprises a spring, fluid operated means for restraining the spring against its bias and a source of fluid therefor in common with the source of fluid for the second fluid chamber.

8. The combination with a brake, a fluid motor for the brake and a fluid power operator for the motor and comprising a cylinder for fluid, a piston for pressurizing the fluid in the cylinder and means for actuating the piston comprising a pressurized fluid cylinder behind the piston and a source of fluid therefor, of a normally restrained auxiliary piston actuator and motion transmitting connections therefrom to said piston and means responsive to loss of fluid pressure in the fluid cylinder behind the piston to release said auxiliary piston actuator for actuation of the piston through said connections, said motion transmitting connections including a rod for the piston, a manually operated lever, linkage means interconnecting the lever with the piston rod for joint action of the pressurized fluid cylinder and the manually operated lever on the piston, and a lost motion connection between the auxiliary piston actuator and the said linkage.

9. In a device of the character described, the combination of a brake, a fluid motor for the brake, a fluid power operator for the motor and comprising a cylinder having a fluid connection to the fluid motor and a piston for pressurizing fluid therein, a cylinder for pressurized fluid at the opposite side of the piston, a source of pressurized fluid for the cylinder last mentioned, a manually operated lever and means connecting said lever to said piston whereby the total force exerted by the piston against the fluid delivered to the motor includes the force exerted on the manual lever and the fluid pressure in the cylinder behind the piston, a normally restrained spring having a lost motion connection with the piston and means for releasing the spring on loss of fluid pressure to the cylinder behind the piston, said spring having a strength sufficient to develop a force on the piston rod substantially equal to the force exerted thereon by the pressurized fluid in the cylinder behind the piston whereby said spring will substitute for the pressure of such fluid on loss of fluid pressure in said cylinder.

10. The device of claim 9 in which the spring is provided with a double-acting fluid operator having a piston and a cylinder at one side of the piston and subject to pressure of the source of fluid for the cylinder behind the brake actuating piston to hold the spring in normally restrained position, means for releasing the fluid in said spring operator cylinder to permit the spring to advance to its operative position where it adds its pressure to the pressure of the fluid in the cylinder behind the piston, a second cylinder in said spring operator at the other side of the piston and means for admitting pressurized fluid to said second cylinder and blocking release therefrom to lock said spring in its said operative position and means for releasing said lock and retracting said spring against its bias to unlock the brake.

11. The combination with a manual brake operator having a fluid pressurized brake assist and linkage means interconnecting the same for joint action, of means to substitute for said manual brake operator to lock the brake and permit release of manual pressure on said manual brake operator and comprising normally restrained auxiliary pressure applying means, means interconnecting the said auxiliary means to said linkage means and means for releasing said auxiliary pressure applying means and pursuant to which it will substitute for the manual brake operator.

12. The combination of claim 11 in which the auxiliary pressure applying means comprises a spring and motion transmitting connections from the spring to the linkage means pursuant to which the bias of the spring will supplement the pressure of the fluid pressurized brake assist, and hydraulic means for selectively retracting said spring against its bias and for concurrently releasing the spring and locking it in released position.

References Cited in the file of this patent
UNITED STATES PATENTS

| 1,997,807 | Bird | Apr. 16, 1935 |
| 2,907,415 | Norman | Oct. 6, 1959 |
| 2,986,428 | Clements | May 30, 1961 |

UNITED STATES PATENT OFFICE
CERTIFICATE OF CORRECTION

Patent No. 3,110,522                      November 12, 1963

Warren E. Bunch

It is hereby certified that error appears in the above numbered patent requiring correction and that the said Letters Patent should read as corrected below.

In the grant, lines 2 and 12, and in the heading to the printed specification, lines 4 and 5, for "Hornischfeger Corporation", each occurrence, read -- Harnischfeger Corporation --; column 1, line 25, for "trunk" read -- truck --.

Signed and sealed this 28th day of April 1964.

(SEAL)
Attest:

ERNEST W. SWIDER

Attesting Officer

EDWARD J. BRENNER

Commissioner of Patents